United States Patent
Fuehling et al.

(10) Patent No.: US 6,990,961 B2
(45) Date of Patent: Jan. 31, 2006

(54) VENTILATION AND AREATION DEVICE FOR A FUEL TANK

(75) Inventors: Stefan Fuehling, Dortmund (DE); Hartmut Ranke, Dortmund (DE)

(73) Assignee: Siemens Aktiengesellschaft, Munich (DE)

( * ) Notice: Subject to any disclaimer, the term of this patent is extended or adjusted under 35 U.S.C. 154(b) by 32 days.

(21) Appl. No.: 10/484,020

(22) PCT Filed: Jul. 31, 2001

(86) PCT No.: PCT/DE02/02604

§ 371 (c)(1),
(2), (4) Date: Jan. 15, 2004

(87) PCT Pub. No.: WO03/016083

PCT Pub. Date: Feb. 27, 2003

(65) Prior Publication Data

US 2004/0206392 A1 Oct. 21, 2004

(30) Foreign Application Priority Data

Jul. 31, 2001 (DE) ........................ 101 37 986

(51) Int. Cl.
*F02M 33/02* (2006.01)

(52) U.S. Cl. ...................................... 123/519
(58) Field of Classification Search ................ 123/519, 123/518, 516; 137/587, 588, 590, 43, 202, 137/630.14
See application file for complete search history.

(56) References Cited

U.S. PATENT DOCUMENTS

| | | | |
|---|---|---|---|
| 3,916,928 A | * | 11/1975 | Enoch ........................... 137/39 |
| 4,487,215 A | * | 12/1984 | Green ........................... 137/43 |
| 5,014,742 A | * | 5/1991 | Covert et al. ................ 137/588 |
| 5,044,389 A | | 9/1991 | Gimby |
| 5,215,132 A | | 6/1993 | Kobayashi |
| 5,678,590 A | | 10/1997 | Kasugai et al. |
| 5,687,756 A | | 11/1997 | VanNatta et al. |
| 5,762,090 A | * | 6/1998 | Halamish et al. ............. 137/43 |
| 5,934,306 A | * | 8/1999 | Guillemenet et al. ......... 137/43 |
| 6,058,963 A | * | 5/2000 | Enge et al. ................. 137/202 |
| 6,450,192 B1 | * | 9/2002 | Romanek ..................... 137/202 |

FOREIGN PATENT DOCUMENTS

| | | |
|---|---|---|
| DE | 197 05 440 A1 | 9/1997 |
| EP | 0 186 372 | 7/1986 |
| EP | 0 962 684 A1 | 12/1999 |
| EP | 0 976 597 A1 | 2/2000 |
| EP | 0 915 771 B1 | 9/2000 |
| FR | 2 593 752 | 8/1987 |
| GB | 2 269 373 A | 9/1994 |
| JP | 2000345933 A | 12/2000 |
| JP | 2001041124 A | 2/2001 |

* cited by examiner

*Primary Examiner*—Mahmoud Gimie
(74) *Attorney, Agent, or Firm*—Richard A. Speer; Mayer, Brown, Rowe & Maw LLP

(57) ABSTRACT

The invention relates to a ventilation and aeration device for a fuel tank (1) of a motor vehicle, comprising a ventilation line (9) leading to the exterior of the fuel tank (1); said ventilation line being connected to the inner area (18) of the fuel tank (1) via a ventilation opening (16) of a ventilation link having a larger throughflow diameter and an aeration opening (21) of an aeration link having a smaller throughflow diameter. The ventilation opening (16) leads into the inner area of the fuel tank (18) at a filling level height (17) which is lower than that of the aeration opening (19) of the aeration link. A roll-over valve (10) is used to seal off the inner area (18) of the fuel tank (1) in relation to the ventilation line (9). The ventilation link and the aeration lead to a common ventilation channel (20) leading to a single roll-over valve (10) whose outlet is connected to the ventilation line (9).

8 Claims, 2 Drawing Sheets

VENTILATION AND AREATION DEVICE FOR A FUEL TANK

BACKGROUND OF THE INVENTION

The invention is concerned with a ventilation and aeration device for a fuel tank, in particular of a motor vehicle, having a ventilation line which leads to the exterior of the fuel tank and is connected to the inner area of the fuel tank via a ventilation opening of a ventilation link of larger through-flow cross section and an aeration opening of an aeration link of smaller through-flow cross section, the ventilation opening of the ventilation link leading into the inner area of the fuel tank at a filling level height which is lower than the aeration opening of the aeration link, and a roll-over valve being used to seal off the inner area of the fuel tank from the ventilation line.

In the case of ventilation and aeration devices of this type, the ventilation opening and ventilation link are used to conduct gas which has been displaced in the fuel tank by the fuel fed in during a refueling process to the outside. If, during the refueling process, the filling level reaches the level of the ventilation opening and the latter is covered in the process by the fuel, gas can no longer be conducted away through the ventilation opening. The fuel which flows in from the refueling and acts on the rest of the volume of gas in the fuel tank causes a pressure to be built up in the fuel tank, the pressure acting on the tank nozzle introduced into the filler neck of the fuel tank and actuating the automatic cutoff contained in this tank nozzle. Further filling of the fuel tank is therefore terminated.

The aeration opening, which is situated higher than the ventilation opening, has only a small cross section which acts as a throttle and through which gas cannot be conducted away sufficiently in order to prevent the described build-up of pressure during refueling.

The ventilation opening serves to conduct away a volume of gas, which becomes enlarged when there is a rise in temperature, to the outside, so that a rise in pressure in the fuel tank does not take place.

In order to prevent fuel from being able to run out of the fuel tank via the ventilation and aeration openings if the motor vehicle is in an accident and overturns, the roll-over valves seal off the ventilation and aeration openings in the corresponding position of the motor vehicle.

In the case of a ventilation and aeration device of the type mentioned at the beginning, it is known to design both the ventilation opening and the aeration opening in a manner such that they can be sealed off in each case by a roll-over valve. The construction of this ventilation and aeration device is very complex and expensive and requires a large structural space.

EP 186 372 A discloses a ventilation and aeration device for a fuel tank having a ventilation line which leads to the exterior of the fuel tank and is connected to the inner area of the fuel tank via a ventilation opening of a ventilation link of larger through-flow cross section and an aeration opening of an aeration link of smaller through-flow cross section. In this case, the ventilation opening of the ventilation link leads into the inner area of the fuel tank at a filling level height which is lower than the aeration opening of the aeration link.

U.S. Pat. No. 5,215,132 A discloses a ventilation and aeration device for a fuel tank, having a ventilation line which leads to the exterior of the fuel tank and is connected to the inner area of the fuel tank via a ventilation opening of a ventilation link of larger through-flow cross section and a further ventilation opening. The ventilation line can be sealed off from the inner area of the fuel tank by a first roll-over valve, to the outlet of which the ventilation line is connected. A second ventilation line leading to the exterior of the fuel tank can be sealed off by a second roll-over valve.

The object of the invention is therefore to provide a ventilation and aeration device of the type mentioned at the beginning which has a simple construction and requires only a small structural space.

BRIEF DESCRIPTION OF THE INVENTION

This object is achieved according to the invention by the fact that the ventilation link and aeration link lead into a common ventilation channel which leads to a single roll-over valve, to the outlet of which the ventilation line is connected.

By bringing the ventilation link and aeration link together upstream of the roll-over valve, it is possible to omit a second roll-over valve, this resulting in a considerable simplification and cost reduction and also in a reduction in the required installation space.

A single ventilation line then leads from the roll-over valve either to the filler neck of the fuel tank and from there on via an activated carbon filter to the outside. However, the ventilation line may also be led directly via an activated carbon filter to the outside.

In one simple design, the ventilation link may be a ventilation pipe which protrudes into the fuel tank and the inner area of which is connected via the ventilation opening to the inner area of the fuel tank.

If, in addition, the aeration opening is a continuous radial recess in the ventilation pipe, said, recess connecting the inner area of the fuel tank to the inner area of the ventilation pipe at a filling level height which is higher than the ventilation opening, then no additional components and no additional structural space are required for the aeration.

In a further, likewise simply constructed variant, the aeration opening can be an aeration pipe of smaller cross section than the cross section of the ventilation pipe.

In this case, no additional structural space is required if the ventilation pipe and the aeration pipe extend axially, in particular coaxially, into the inner area of the fuel tank.

In order to ensure that there is sufficient space for a minimum volume of gas in a fully refueled fuel tank, the ventilation opening can lead into the inner area of the fuel tank approximately at a filling level height of 85% to 90% of the entire volume of said fuel tank.

If the aeration opening leads into the inner area of the fuel tank close to the highest point of said fuel tank, then an aeration of the tank under largely all operating conditions of the motor vehicle is ensured.

A bubble-type extraction tank can be arranged downstream of the roll-over valve in the ventilation line and is used to separate off fuel particles contained in the gas conducted away from the fuel tank and to return them to the fuel tank.

If the roll-over valve is arranged within the fuel tank, then the quantity of fuel which penetrates by means of permeation to outside the fuel tank is kept particularly small.

However, the roll-over valve may also be arranged outside the fuel tank.

The roll-over valve preferably has a passage opening which can be closed by a closing element and leads from the ventilation channel to the ventilation line, it being possible for the closing element to be acted upon in the closing direction by a gravity-loaded body and/or a floating body. If the motor vehicle is upside-down, the gravity-loaded body subjects the closing element to its weight and keeps said closing element on the passage opening, with the result that fuel cannot run out. The floating body is used to act upon the closing element in a manner closing the passage opening if the fuel in the fuel tank should rise to such an extent that the floating body is caused to float.

The ventilation line may lead directly to an activated carbon filter or else to a filler neck of the fuel tank 20 and from there onto an activated carbon filter.

BRIEF DESCRIPTION OF THE DRAWINGS

An exemplary embodiment of the invention is illustrated in the drawing and will be described in greater detail below. In the drawing

DETAILED DESCRIPTION OF THE INVENTION

Figure 1:
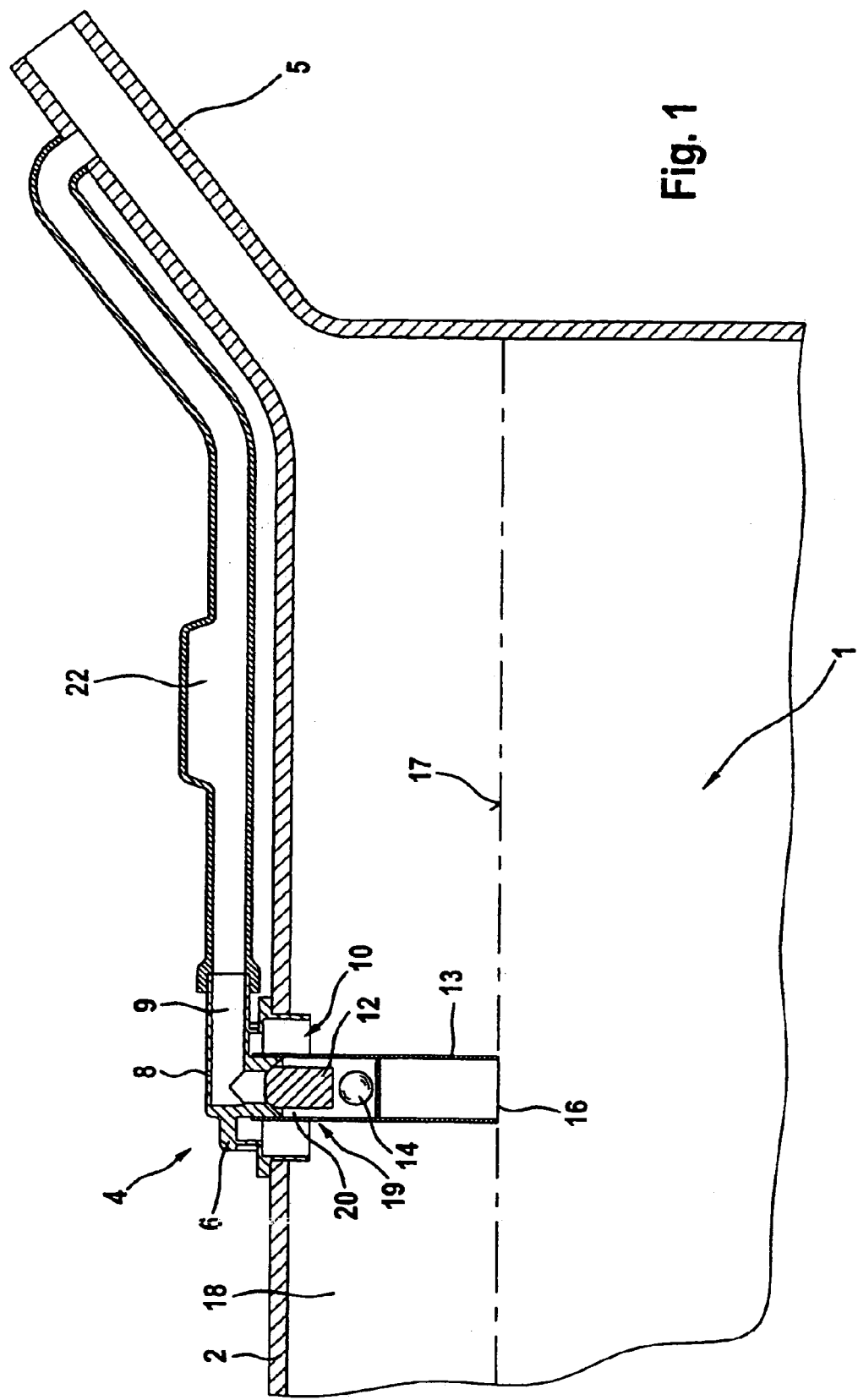
FIG. 1 shows, in section, a detail of a side view of a fuel tank having a ventilation and aeration device
Figure 2:
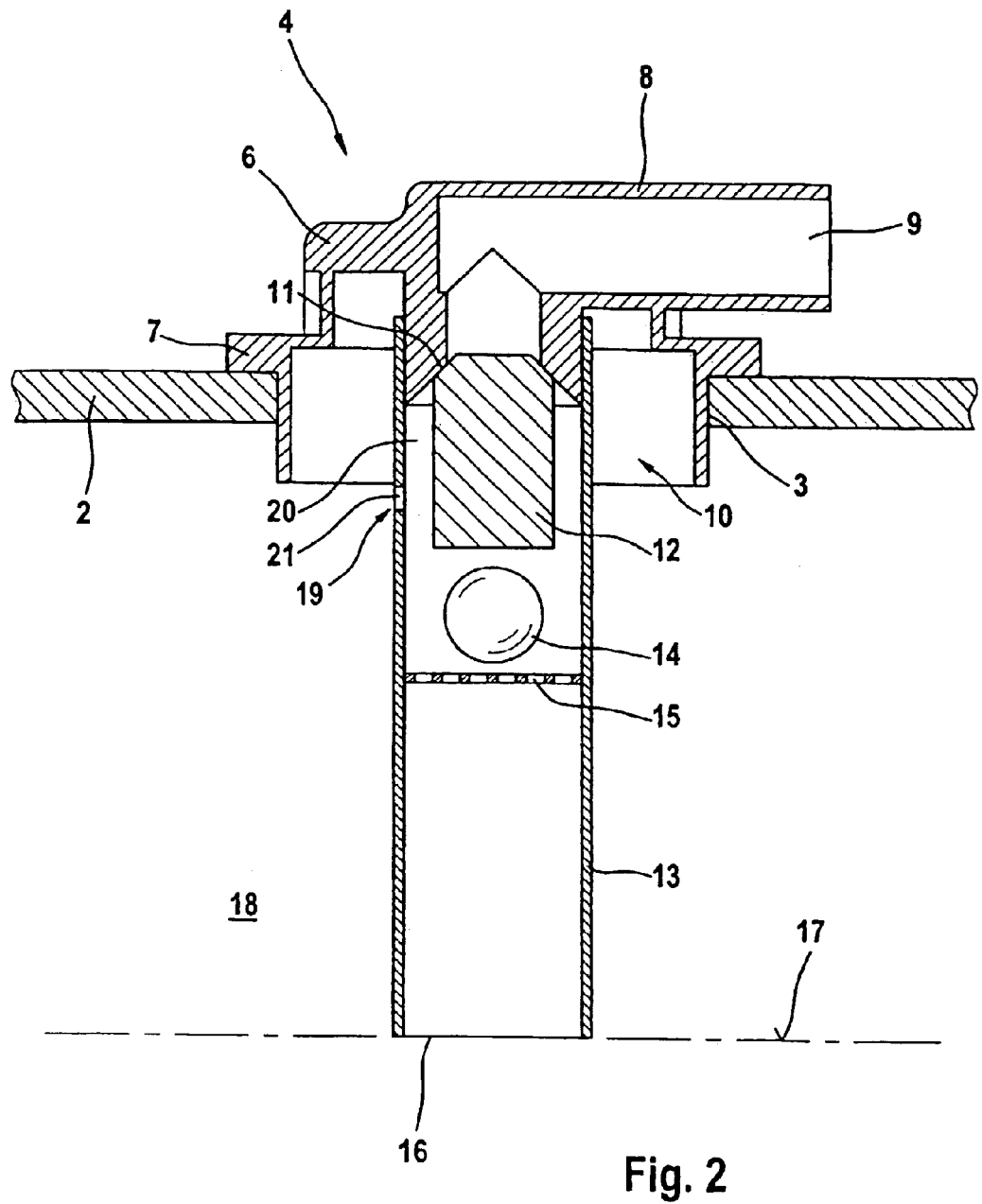
FIG. 2 shows an enlarged illustration of the ventilation and aeration device according to FIG. 1.

The fuel tank 1 which is illustrated in FIG. 1 has, on its upper wall 2, an opening 3 (see FIG. 2) into which a ventilation and aeration device 4 is inserted closing the opening 3. Furthermore, the fuel tank 1 has a filler neck 5 leading in its right-hand, upper region.

The ventilation and aeration device 4 has a cover part 6 with a flange 7, which cover part can be inserted into the opening 3 until the flange 7 rests on the upper wall 2, and by means of which the opening 3 can be closed.

A connecting branch 8 which leads outward and has a ventilation line leading to the exterior of the fuel tank 1 is formed integrally on the cover part 6. The tank-side end of the ventilation line 9 is a passage opening 11 which is designed as a valve seat of a roll-over valve 10 and can be closed by a closing element 12. The closing element 12 is moved in the direction of the tank exterior for closing purposes.

Coaxially with the passage opening 11, a ventilation pipe 13 extends approximately vertically into the inner area 18 of the fuel tank 1, said ventilation pipe being fastened at its upper end to the cover part 6 and forming a guide for the closing element 12.

Furthermore, on that side of the closing element 12 which faces away from the passage opening 11, a freely movable ball forming a gravity-loaded body 14 is arranged in the ventilation pipe 13 and, given an appropriate upside-down position of the tank, subjects the closing element 12 to the force of its weight pushing it against the valve seat of the passage opening 11 and closes the latter.

In order to keep the ball close to the closing element 12, a grid 15 is arranged below the ball in the ventilation pipe 13, the grid, however, only insignificantly reducing the passage cross section of the ventilation pipe 13.

The ventilation pipe 13 leads with its ventilation opening 16 into the inner area 18 of the fuel tank 1 at a filling level height 17 of 85% of the entire volume of said fuel tank.

A continuous recess is formed directed radially in the ventilation pipe 13 at the height of the closing element 12 close to the highest point of the fuel tank 1, said recess forming an aeration link 19 which leads with its aeration opening 21 into the inner area 18 of the fuel tank 1. The region in the ventilation pipe 13 between the aeration link 19 and the passage opening 11 forms a ventilation channel 20, into which the gas entering into the ventilation pipe 13 from the inner area 18 of the fuel tank 1 via the ventilation opening 16 and the ventilation opening 21 is jointly supplied via the roll-over valve 10 and the passage opening 11 of the ventilation line 9.

The ventilation opening 16 has a considerably larger passage cross section than the aeration opening 21 acting as a throttle, so that gas which is to be displaced during refueling can be conducted away without obstruction via the ventilation opening 16 as long as this ventilation opening 16 is not yet covered by the fuel in the fuel tank 1 and is therefore sealed off. However, volumes of gas of this type which are displaced during refueling are too large to be able to be conducted away via the remaining aeration opening 21, and so a pressure which cuts off the fuel nozzle builds' up in the fuel tank 1.

The ventilation line 9 leads on from the connecting branch 8 via a bubble-type extraction tank 22 to the filler neck 5 where it leads into its upper end. Fuel particles contained in the gas are separated off by the bubble-type extraction tank and returned via the ventilation line 9 and the open roll-over valve 10 into the inner area 18 of the fuel tank 1.

What is claimed is:

1. A ventilation and aeration system for a fuel tank of a motor vehicle comprising:
    a) a ventilation line (9) mounted on an upper wall of the fuel tank to provide connection between the exterior and the interior volume of the tank:
    b) a ventilation link (13) connected to the ventilation line (9) and extending downwardly into the tank, the link having;
        i) a ventilation opening (16) of a first through-flow cross section in the ventilation link (13) at or near the end thereof which is further from the upper wall of the tank, and
        ii) an aeration opening (21) of a second through-flow cross section in the ventilation link (13) at a location which is nearer to the upper wall of the tank than is the ventilation opening (16), wherein the aeration opening (21) is sufficiently smaller than the ventilation opening (16) that gas pressure increases in the volume of the tank above the fuel level as the tank is filled, to thereby cause fueling to stop; and
    c) a single roll-over valve (10) having a non-buoyant blocking element 12 located nearer to the tank upper wall than both the ventilation and the aeration openings to block the connection between the ventilation link and the ventilation line when the tank is inverted.

2. The ventilation and aeration device as claimed in claim 1, characterized in that the ventilation link is a ventilation pipe (13) which protrudes into the fuel tank (1) and the inner area of which is connected via the ventilation opening (16) to the inner volume (18) of the fuel tank (1).

3. A ventilation and aeration system for a fuel tank of a motor vehicle comprising:
    a) a ventilation line (9) mounted on an upper wall of the fuel tank to provide connection between the exterior and the interior volume of the tank;
    b) a ventilation link (13) connected to the ventilation line (9) and extending downwardly into the tank, the link having;
        i) a ventilation opening (16) of a first through-flow cross section in the ventilation link (13) at a filling level height (17) of 85% to 90% of the entire volume of the fuel tank ii) an aeration opening (21) of a second through-flow cross section in the ventilation link (13) at a location which is nearer to the upper wall of the tank than is the ventilation opening (16), wherein the aeration opening (21) is sufficiently smaller than the ventilation opening (16) that gas pressure increases in the volume of the tank above the fuel level as the tank is filled, to thereby cause fueling to stop; and c) a single roll-over valve (10) having a non-budget blocking element 12 located nearer to the tank upper wall than both the ventilation and the aeration openings to block the connection between the ventilation link and the ventilation line when the tank is inverted.

4. The ventilation and aeration device as defined in claim 1 or 3, wherein a bubble-type extraction tank (22) is arranged downstream of the roll-over valve (10) in the ventilation line (9).

5. The ventilation and aeration device as defined in claim 1 or 3, wherein the roll-over valve (10) is arranged within the fuel tank.

6. The ventilation and aeration device defined in claim 1 or 3, wherein the roll-over valve is arranged outside the fuel tank.

7. The ventilation and aeration device as defined in claim 1 or 3, wherein the ventilation line (9) leads to an activated carbon filter.

8. The ventilation and aeration device as defined in claim 1 or 3, wherein the ventilation line (9) leads to a filler neck (5) of the fuel tank (1).

* * * * *

UNITED STATES PATENT AND TRADEMARK OFFICE
CERTIFICATE OF CORRECTION

PATENT NO.     : 6,990,961 B2
DATED          : January 31, 2006
INVENTOR(S)    : Stefan Fuehling and Hartmut Rankne It is certified that error appears in the above-identified patent and that said Letters Patent is hereby corrected as shown below:

<u>Title page,</u>
Item [22], PCT Filed, substitute "Jul. 16, 2002" with -- Jul. 31, 2001 --.

Signed and Sealed this

Twenty-third Day of May, 2006

JON W. DUDAS
*Director of the United States Patent and Trademark Office*

UNITED STATES PATENT AND TRADEMARK OFFICE
CERTIFICATE OF CORRECTION

PATENT NO.     : 6,990,961 B2                                              Page 1 of 1
DATED          : January 31, 2006
INVENTOR(S)    : Stefan Fuehling and Hartmut Rankne It is certified that error appears in the above-identified patent and that said Letters Patent is hereby corrected as shown below:

<u>Title page,</u>
Item [54], Title, should read -- VENTILATION AND AERATION DEVICE FOR A FUEL TANK --.

Signed and Sealed this

Thirteenth Day of June, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,990,961 B2 | Page 1 of 1 |
| APPLICATION NO. | : 10/484020 | |
| DATED | : January 31, 2006 | |
| INVENTOR(S) | : Stefan Fuehling and Hartmut Rankne | |

It is certified that error appears in the above-identified patent and that said Letters Patent is hereby corrected as shown below:

<u>Title page, Item [54] and Column 1, line 1,</u>
Title, substitute "VENTILATION AND AERATION DEVICE FOR A FUEL TANK" for -- VENTILATION AND AREATION DEVICE FOR A FUEL TANK --.

Signed and Sealed this

Eighteenth Day of July, 2006

JON W. DUDAS
*Director of the United States Patent and Trademark Office*